United States Patent [19]

Lemak et al.

[11] Patent Number: 4,851,949
[45] Date of Patent: Jul. 25, 1989

[54] BRUSH BOUNCE DETECTION IN ACTIVE SHAFT GROUND SYSTEM

[75] Inventors: Thomas A. Lemak, McKeesport, Pa.; Robert L. Osborne, Nether Providence Township, Seminole County; Michael Twerdochlib, Oviedo, both of Fla.

[73] Assignee: Westinghouse Electric Corp., Pittsburgh, Pa.

[21] Appl. No.: 205,695

[22] Filed: Jun. 13, 1988

[51] Int. Cl.$^4$ .............................................. H02H 7/08
[52] U.S. Cl. ....................................... 361/23; 361/31; 361/33; 324/545
[58] Field of Search ...................... 361/42, 86, 87, 88, 361/93, 23, 30, 31, 33; 324/511, 553, 545, 552; 340/660, 661, 664

[56] References Cited

U.S. PATENT DOCUMENTS

| | | | |
|---|---|---|---|
| 4,122,388 | 10/1978 | Bernasconi et al. | 324/545 X |
| 4,667,262 | 5/1987 | Maier | 361/42 |
| 4,743,998 | 5/1988 | Wu | 361/42 |

*Primary Examiner*—Derek S. Jennings
*Attorney, Agent, or Firm*—K. Bach

[57] ABSTRACT

In an active shaft ground system for maintaining a rotating shaft (4) of a machine substantially at ground potential, which system includes a circuit coupled to the shaft (4) for monitoring the voltage on the shaft (4) relative to ground and a brush (6) coupled to the circuit and contacting the shaft (4) for conducting to the shaft (4) a compensating current having an amplitude and polarity adjusted for maintaining the shaft voltage substantially at ground potential, there is provided shaft condition detection circuitry (18,20,24,26,28,34,36) coupled to the circuit for monitoring the voltage on the shaft (4) relative to ground and the current flowing between the brush (6) and the shaft (4) and for producing a fault indication when the voltage on the shaft (4) relative to ground is outside of a selected range at the same time that the current flowing through the brush (6) is substantially equal to zero. The detection circuitry permits reliable monitoring of brush bounce and distinguishes between that condition and brush rub.

10 Claims, 1 Drawing Sheet

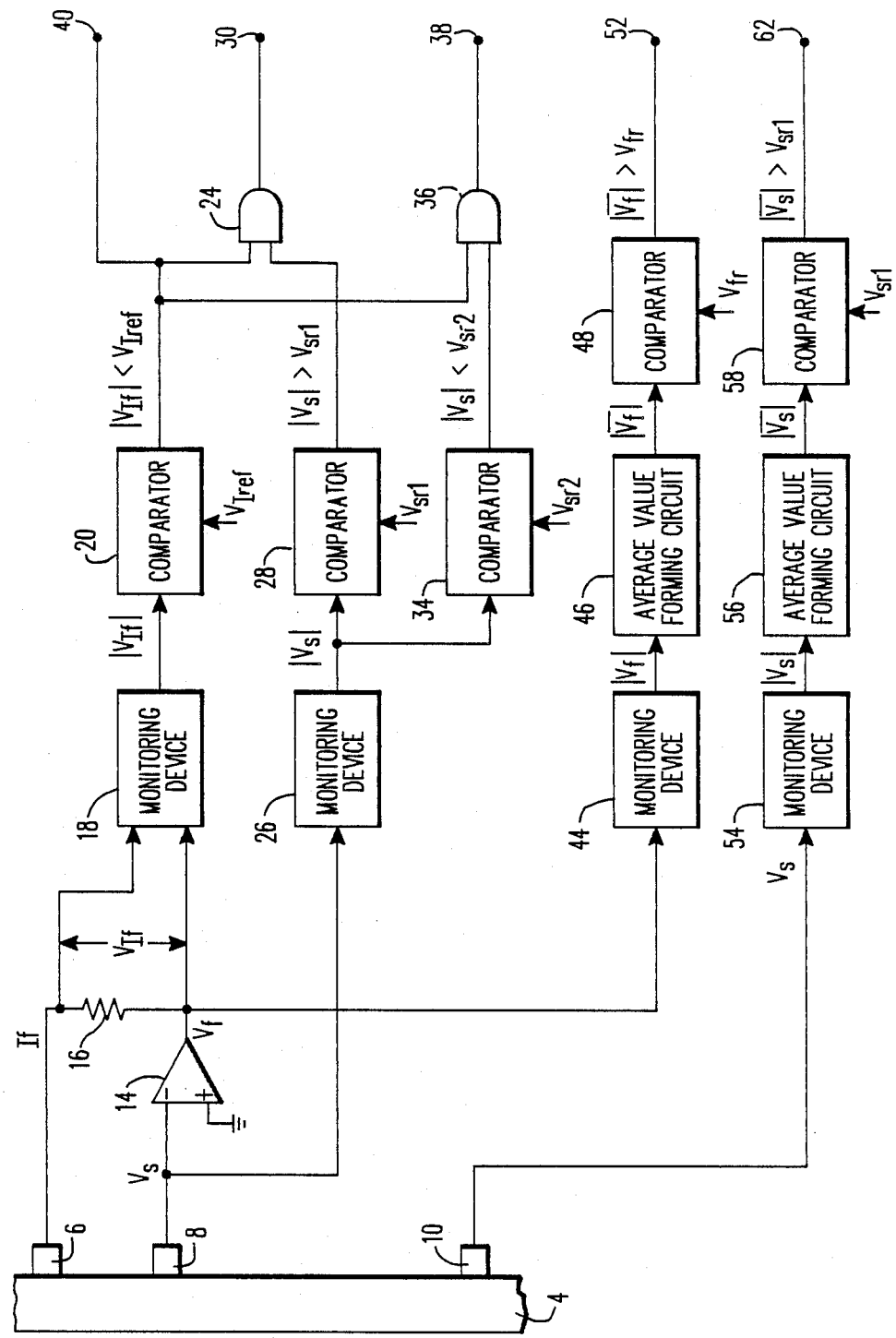

BRUSH BOUNCE DETECTION IN ACTIVE SHAFT GROUND SYSTEM

BACKGROUND OF THE INVENTION

The present invention relates to an active shaft ground system having a voltage sensing brush and a current feedback brush in sliding contact with a rotating shaft.

In rotating machines, for example large turbine generators, it is not feasible to establish a reliable passive ground connection to the shaft. In the absence of a suitable ground connection, a potentially destructive voltage can build up in the rotating shaft, which voltage can produce localized heating, possibly resulting in failure of shaft bearings. This appears to be due to the fact that the shaft, when rotating, acts as a high impedance electrostatic potential generator.

In order to prevent such voltage buildup, it is known to employ an active shaft ground system which includes a sensing brush contacting the shaft in order to sense the shaft voltage and a feedback brush which also contacts the shaft and is connected to apply a current having a value which neutralizes the electrostatic charge buildup on the shaft. Circuitry connected between the brushes acts to maintain the feedback current at the requisite level. The circuitry is arranged to vary the feedback current in response to shaft voltage variations.

While such active shaft ground systems have proven satisfactory in practice, there have been cases in which potentially harmful momentary shaft voltages have developed during the occurrence of feedback brush bounce, resulting in temporary loss of contact between the feedback brush and the shaft surface. During these times, the active shaft ground system is rendered ineffective and the shaft voltage is free to rise. Measurements performed on a large turbine generator have shown that the shaft voltage can rise by as much as 50 volts during a brush bounce intervals of 1.7 ms.

In existing systems, such brush bounce condition cannot be detected and it appears that repeated occurrence of this condition can eventually result in machine damage.

If this condition could be reliably detected, corrective measures, such as brush replacement or adjustment, could be taken before significant damage occurs.

Another condition which can occur on an intermittent basis during the operation of such machines is one in which the shaft rubs against a stationary machine part which is at ground potential. When this occurs, short circuit currents can flow between the shaft and ground. Since this condition causes the shaft voltage to fall to zero, the feedback current will correspondingly drop to a zero value. A rub condition cannot be easily corrected and normally requires a complete overhaul of the machine.

Since, however, brush bounce may be easily correctable, it is desirable to be able to distinguish between the two conditions.

SUMMARY OF THE INVENTION

It is a primary object of the present invention to reliably detect the occurrence of brush bounce in an active shaft ground system.

Another object of the invention is to distinguish between the occurrence of brush bounce and shaft rub in a machine equipped with such a system.

A further object of the invention is to reliably detect the occurrence of shaft rub in a machine equipped with such a system.

With these objects in view, the present invention resides in an active shaft ground system for maintaining a rotating shaft of a machine substantially at ground potential, which system includes circuit means coupled to the shaft for monitoring the voltage on the shaft relative to ground and a brush coupled to the circuit means and contacting the shaft for conducting to the shaft a compensating current having an amplitude and polarity adjusted for maintaining the shaft voltage substantially at ground potential, in combination with shaft condition detection means coupled to the circuit means for monitoring the voltage on the shaft relative to ground and the current flowing between the brush and the shaft and for producing a fault indication when the voltage on the shaft relative to ground is outside of a selected range at the same time that the current flowing through the brush is substantially equal to zero.

According to a principal feature of the present invention, a condition indication is produced as a function of both the shaft voltage and the feedback current level. Since both feedback brush bounce and shaft rub will normally result in decrease of the feedback current to a value equal to or close to zero, this approach enables a ready distinction to be made between the two conditions.

Thus, according to preferred embodiments of the invention, a brush bounce indication is produced only when substantial disappearance of the feedback current is accompanied by an increase in the shaft voltage, whereas disappearance of the feedback current accompanied by a drop in the shaft voltage will not produce a brush bounce alarm signal, but can be used to produce a rub condition indication.

BRIEF DESCRIPTION OF THE DRAWING

The invention will become more readily apparent from the following description of a preferred embodiment thereof shown, by way of example only, in the accompanying drawing, wherein:

The sole FIGURE is a block circuit diagram of an active shaft ground system equipped with monitoring circuitry according to the present invention.

DESCRIPTION OF THE PREFERRED EMBODIMENTS

The FIGURE illustrates an active shaft ground system for maintaining a machine shaft 4 at ground potential during machine operation, combined with a preferred embodiment of monitoring circuitry according to the invention.

The shaft grounding system includes three carbon brushes 6, 8 and 10 each in sliding conductive contact with the periphery of shaft 4. Brush 6 is a current feedback brush, while brushes 8 and 10 are shaft voltage sensing brushes.

Brush 8 is connected to the inverting input of a high gain operational amplifier 14 whose noninverting input is connected to a grounding point of the frame of the machine containing shaft 4. Amplifier 14 receives an input voltage corresponding to the voltage $V_s$ on shaft 4 and produces an output voltage $V_f$, which is an amplified version of $V_s$. In a typical exemplary embodiment of the invention, amplifier 14 may have a voltage gain of 110 dB and operates over a frequency range of 0–3 kHz. The output of amplifier 14 produces a feedback current $I_f$ which is conducted to feedback brush 6 via a measuring resistor 16, causing a voltage $V_{If}$ to develop across resistor 16 which is proportional to the feedback current $I_f$.

The voltage proportional to $I_f$ is applied to a monitoring device 18 which generates an output signal representative of the absolute value of $I_f$. This output signal is applied to a first comparator 20 which compares the absolute value with a signal $V_{Iref}$ representing a reference current $I_{ref}$. If the absolute value of $I_f$ is less than $I_{ref}$, circuit 20 generates an output signal which is applied to one input of an AND-gate 24 and is interpreted by that gate as a logic "1".

In addition, the voltage $V_s$ on brush 8 is applied to a second monitoring device 26 which produces an output signal proportional to the absolute value of $V_s$. This output signal is applied to a second comparator 28 together with a reference signal $V_{sr1}$ and comparator 28 produces an output signal when the absolute value of $V_s$ is greater than $V_{sr1}$. This output signal is applied to a second input of AND-gate 24, where it is interpreted as a logic "1". When a logic "1" signal is being applied simultaneously to each input of gate 24, an alarm signal is produced at output terminal 30, indicative of loss of conductive contact between brush 6 and shaft 4.

The output of monitoring device 26 is further connected to a signal input of a third comparator 34 which is connected to receive a reference signal $V_{sr2}$. The output of comparator 34 is connected to one input of a further AND-gate 36 and applies a logic "1" signal to that input when the absolute value of $V_s$ is less than $V_{sr2}$. The output of comparator 20 is connected to a second input of gate 36. An output terminal 38 connected to the output of gate 36 produces an alarm signal when both inputs of gate 36 receive signals constituting a logic "1".

The reference value $V_{Iref}$ is selected to correspond to a value of $I_f$ which is just slightly greater than zero so that comparator 20 will produce an output signal when substantially no feedback current is flowing between brush 6 and shaft 4. The reference value $V_{sr1}$ is selected to cause comparator 28 to produce an output signal when $V_s$ clearly has a value greater than that occurring during normal operation of the active shaft grounding system. Therefore, an alarm signal will appear at terminal 30 when brush 6 is experiencing bounce.

Conversely, the value of $V_{sr2}$ is selected to correspond to a voltage value just slightly greater than zero, so that comparator 34 will produce an output signal when $V_s$ has a value at or close to 0. Thus, output terminal 38 will produce an alarm signal when shaft 4 is experiencing a rub condition.

It may infrequently occur that sensing brush 8 is experiencing bounce at the same moment as feedback brush 6. If sensing brush 8 should experience brush bounce, the voltage on that brush will not necessarily drop to zero because of capacitive effects inherent in the system, electrostatic induction effects existing between shaft 4 and brush 8, and the connection of brush 8 to high impedance inputs. Under these circumstances, the absolute value of the voltage on brush 8 may remain within the limits defined by $V_{sr1}$ and $V_{sr2}$, so that an alarm signal will not appear at either terminal 30 or terminal 38.

To take account of this possibility, there is provided a further output terminal 40 which produces a provisional alarm signal whenever the absolute value of the feedback current $I_f$ falls below the value represented by $V_{Iref}$.

During continued operation of the active shaft ground system, the brushes will experience wear and glazing which will have the effect of increasing their contact resistance. When the contact resistance associated with feedback brush 6 increases, the level which feedback voltage $V_f$ must achieve in order to produce a current which compensates for the shaft voltage $V_s$ correspondingly increases. Thus, monitoring of the average value $V_f$ can provide an indication of the need for brush maintenance. In order to monitor this condition, the voltage $V_f$ at the output of amplifier 14 may be supplied to a further monitoring device 44 which produces an output signal proportional to the absolute value of $V_f$. This signal is applied to an average value forming circuit 46, which may typically have a time constant of the order of 500 ms, producing an output signal representative of the average, over a selected time period, of the absolute value of $V_f$. This signal is supplied to a comparator 48 together with a reference value signal $V_{fr}$. When the average absolute value of $V_f$ is greater than $V_{fr}$, a brush maintenance signal is produced at output terminal 52 connected to the output of comparator 48. The value of $V_{fr}$ is selected under consideration of the degree of wear which necessitates a brush maintenance procedure.

In order to monitor the various electronic components of the system described thus far, an independent shaft voltage monitoring operation can be performed on the basis of the voltage appearing on sensing brush 10. For this purpose, brush 10 is connected to the input of a monitoring device 54 which produces an output signal representative of the absolute value of $V_s$, as received by brush 10. This signal is supplied to an average value forming circuit 56, the output of which is supplied to one input of a comparator 58 that also receives a signal representative of the comparison value of $V_{sr1}$. Typically, average value forming circuit 56 could have a time constant of the order of 120 ms.

When the average absolute value of $V_s$ is greater than $V_{sr1}$, indicating that the voltage on shaft 4 has exceeded a selected threshold value for more than a predetermined period of time, an electronics failure indication signal is produced at terminal 62 which is connected to the output of comparator 58. This signal could be employed to shut down the active shaft ground system, produce an alarm signal and automatically connect, via appropriate relays, each of brushes 6 and 8 directly to a ground point of the machine frame.

What is claimed:

1. In an active shaft ground system for maintaining a rotating shaft of a machine substantially at ground potential, which system includes circuit means coupled to the shaft for monitoring the voltage on the shaft relative to ground and a brush coupled to the circuit means and contacting the shaft for conducting to the shaft a compensating current having an amplitude and polarity adjusted for maintaining the shaft voltage substantially at ground potential, the improvement comprising shaft condition detection means coupled to said circuit means for monitoring the voltage on the shaft relative to ground and the current flowing between said brush and the shaft and for producing a fault indication when the voltage on the shaft relative to ground is outside of a selected range at the same time that the current flowing through said brush is substantially equal to zero.

2. A system as defined in claim 1 wherein said shaft condition detection means comprise brush bounce indicating means connected for producing an indication of momentary loss of contact between said brush and the shaft when the voltage on the shaft relative to ground is above a selected value constituting the upper end of the selected range at the same time that the current flowing through said brush is substantially equal to zero.

3. A system as defined in claim 2 wherein said brush bounce indicating means comprise a first comparator connected for producing an output indication when the magnitude of the feedback current is less than a current comparison value slightly greater than zero, a second comparator connected for producing an output indication when the magnitude of the voltage on the shaft relative to ground is greater than a voltage comparison value corresponding to the upper end of the selected range, and signal producing means connected to said first and second comparators for producing a brush bounce indication signal when both of said comparators simultaneously produce an output indication.

4. A system as defined in claim 3 wherein said signal producing means comprise an AND-gate.

5. A system as defined in claim 3 wherein said shaft condition detection means comprise output signal generating means connected to said first comparator for providing a provisional brush bounce indication when said first comparator produces an output indication.

6. A system as defined in claim 3 wherein said shaft condition detection means comprise shaft-to-ground short indicating means connected for producing an indication that the shaft is contacting a grounded stationary machine part when the voltage on the shaft relative to ground is below a selected value constituting the lower end of the selected range at the same time that the current flowing through said brush is substantially equal to zero.

7. A system as defined in claim 6 wherein said shaft-to-ground shot indicating means comprise a third comparator connected for producing an output indication when the magnitude of the voltage on the shaft relative to ground is less than a voltage comparison value corresponding to the lower end of the selected range, and second signal producing means connected to said first and third comparators for producing a brush bounce indication signal when both of said comparators simultaneously produce an output indication.

8. A system as defined in claim 7 wherein said second signal producing means comprise an AND-gate.

9. A system as defined in claim 2 wherein said shaft condition detection means comprise shaft-to-ground short indicating means connected for producing an indication that the shaft is contacting a grounded stationary machine part when the voltage on the shaft relative to ground is below a selected value constituting the lower end of the selected range at the same time that the current flowing through said brush is substantially equal to zero.

10. A system as defined in claim 1 wherein said shaft condition detection means comprise shaft-to-ground short indicating means connected for producing an indication that the shaft is contacting a grounded stationary machine part when the voltage on the shaft relative to ground is below a selected value constituting the lower end of the selected range at the same time that the current flowing through said brush is substantially equal to zero.

* * * * *